(12) United States Patent
Zhi et al.

(10) Patent No.: US 11,267,050 B2
(45) Date of Patent: Mar. 8, 2022

(54) METHOD FOR FORMING HORIZONTAL OVERHANGING STRUCTURE WITHOUT VERTICAL SUPPORT IN SELECTIVE LASER MELTING

(71) Applicant: Intelligent Manufacturing Institute of Hefei University of Technology, Hefei (CN)

(72) Inventors: Xinlei Zhi, Beijing (CN); Zijun Yuan, Hefei (CN); Xiangdong Chen, Hefei (CN); Zhaohua Yan, Changzhou (CN)

( * ) Notice: Subject to any disclaimer, the term of this patent is extended or adjusted under 35 U.S.C. 154(b) by 112 days.

(21) Appl. No.: 16/726,851

(22) Filed: Dec. 25, 2019

(65) Prior Publication Data

US 2020/0130057 A1   Apr. 30, 2020

(30) Foreign Application Priority Data

Sep. 2, 2019   (CN) .......................... 201910823511.6

(51) Int. Cl.

| | |
|---|---|
| *B22F 3/105* | (2006.01) |
| *B22F 10/38* | (2021.01) |
| *B22F 10/28* | (2021.01) |
| *B22F 10/366* | (2021.01) |
| *B22F 10/36* | (2021.01) |
| *B22F 10/40* | (2021.01) |

(Continued)

(52) U.S. Cl.
CPC ............ *B22F 10/385* (2021.01); *B22F 10/28* (2021.01); *B22F 10/36* (2021.01); *B22F 10/366* (2021.01); *B22F 10/40* (2021.01); *B22F 10/10* (2021.01); *B22F 2301/35* (2013.01); *B22F 2998/10* (2013.01); *B33Y 10/00* (2014.12)

(58) Field of Classification Search
CPC ...... B22F 10/385; B22F 10/47; B22F 10/366; B22F 10/36
See application file for complete search history.

(56) References Cited

U.S. PATENT DOCUMENTS

2018/0169757 A1* 6/2018 Murao ................... B33Y 50/02

OTHER PUBLICATIONS

Roehling, Tien T., et al. "Modulating laser intensity profile ellipticity for microstructural control during metal additive manufacturing." Acta Materialia 128 (2017): 197-206. (Year: 2017).*

(Continued)

*Primary Examiner* — Anthony M Liang

(57) ABSTRACT

A method for forming a horizontal overhanging structure without vertical support in selective laser melting, comprising: sequentially forming an initial layer, a repair layer and a conventional layer, wherein initial layer is printed by scanning at a speed set lower than the conventional speed using a laser spot in a defocused state, so that the Plateau-Rayleigh instability effect occurs in each track, to form an initial layer with a specific texture structure; repair layer is printed on upper surface of the initial layer by scanning at a speed set higher than conventional speed in a continuous-wave laser output mode using a laser spot in a focused state, and completes the transition from transition process parameter to conventional process parameters within the set number of processing layers; and conventional layer is printed on upper surface of repair layer using conventional process parameters, to form a horizontal overhanging structure without vertical support.

3 Claims, 4 Drawing Sheets

(51) Int. Cl.
 *B33Y 10/00* (2015.01)
 *B22F 10/10* (2021.01)

(56) References Cited

OTHER PUBLICATIONS

Gunenthiram, Valérie, et al. "Analysis of laser-melt pool-powder bed interaction during the selective laser melting of a stainless steel." Journal of Laser Applications 29.2 (2017): 022303. (Year: 2017).*

* cited by examiner

METHOD FOR FORMING HORIZONTAL OVERHANGING STRUCTURE WITHOUT VERTICAL SUPPORT IN SELECTIVE LASER MELTING

TECHNICAL FIELD

The present invention relates to the technical field of additive manufacturing, that is, 3D Printing, and particularly to a method for forming a horizontal overhanging structure in Selective Laser Melting (SLM).

BACKGROUND

Selective Laser Melting (SLM) is one of the main technologies of metal additive manufacturing. Based on the concept of layered manufacturing, the technology obtains corresponding processing data by establishing a digital model of workpiece, slice layering, and path planning, and then uses laser to print the workpiece layer by layer. SLM is different from the traditional machining manufacturing process. In theory, any complex entities can be manufactured by SLM. The application has been expended to the aerospace, medical, automotive manufacturing and other fields.

The difficulty in 3D printing is the overhanging structure of workpiece. Generally, a method of setting a temporary vertical support is adopted, that is, a vertical support is printed below the overhanging structure, and the support is removed after printing is completed. For the SLM technology, both the vertical support and the workpiece are processed from the same metal powder, being difficult to remove. Especially for those closed cavity structures in which the conventional vertical support cannot be removed, the practical application of the SLM technology is limited.

SUMMARY

Aiming at the defect existing in the prior art, the present invention provides a method for forming a horizontal overhanging structure without vertical support in selective laser melting, to solve the problem that it is difficult to process the closed cavity structure at present.

To solve the technical problem, the present invention adopts the following technical solution.

The method for forming a horizontal overhanging structure without vertical support in selective laser melting is characterized in comprising: sequentially forming an initial layer, a repair layer and a conventional layer, wherein:

the initial layer is printed by scanning at a speed set lower than the conventional speed using a laser spot in a defocused state, so that the Plateau-Rayleigh instability effect occurs in each track, to form an initial layer with a specific texture structure; the specific texture structure refers to: forming texture different from the scanning direction using the Plateau-Rayleigh instability effect which occurs in the track;

the repair layer is printed on the upper surface of the initial layer by scanning at a speed set higher than the conventional speed in a continuous-wave laser output mode using a laser spot in a focused state, and completes the transition from transition process parameters to conventional process parameters within the set number of processing layers; and the conventional layer is printed on the upper surface of the repair layer using conventional process parameters to form a horizontal overhanging structure without vertical support.

The method for forming a horizontal overhanging structure without vertical support in selective laser melting of the present invention is also characterized in that:

the process parameters of the initial layer are set into:

$$A_1=(1.4\text{-}1.7)A_3;\ V_1=(10\%\text{-}40\%)V_3;\ L_1=(1.3\text{-}1.6)L_3;\ M_3<M_1;$$

where:

$A_1$ represents the diameter of the scanning laser spot of the initial layer, $A_3$ represents the diameter of the scanning laser spot of the conventional layer;

$V_1$ represents the scanning speed of the initial layer, $V_3$ represents the scanning speed of the conventional layer;

$L_1$ represents the scanning spacing of the initial layer, $L_3$ represents the scanning spacing of the conventional layer;

$M_1$ represents the linear energy density of the initial layer, $M_3$ represents the linear energy density of the conventional layer; and the number of the processing layer of the initial layer is 1; linear energy density=laser power/scanning speed.

The method for forming a horizontal overhanging structure without vertical support in selective laser melting of the present invention is also characterized in that: the repair layer is printed on the upper surface of the initial layer using the transition process parameters according to the following two phases:

first phase: scanning at high speed in a continuous-wave laser output mode:

$$A_{21}=A_3;\ V_{21}=(3\text{-}6)V_3;\ L_3<L_{21}<L_1;\ M_{21}=(50\%\text{-}70\%)M_3;$$

where:

$A_{21}$ represents the diameter of the scanning laser spot in the first phase; $V_{21}$ represents the scanning speed in the first phase;

$L_{21}$ represents the scanning spacing in the first phase; $M_{21}$ represents the linear energy density in the first phase;

the number of the processing layers in the first phase is 2-4, wherein the scanning direction of the first layer is along a non-zero included angle from the scanning direction of the initial layer, and the scanning directions of the subsequent layers are rotated 90° layer by layer;

second phase: setting other process parameters into conventional process parameters for selective laser melting except for the linear energy density and scanning spacing;

wherein the linear energy density and scanning spacing are set as follows: from the line energy density $M_{21}$, the line energy density of each processing layer in the second phase is increased layer by layer, and from the scanning spacing $L_{21}$, the scanning spacing of each processing layer in the second phase is reduced layer by layer, so that the transition consistent with all process parameters of the conventional layer is completed within 10-20 processing layers.

The method for forming a horizontal overhanging structure without vertical support in selective laser melting of the present invention is also characterized in that: for stainless-steel powder, printing to form a horizontal overhanging structure without vertical support according the following steps:

Step 1:

unidirectionally scanning using continuous-wave laser, wherein the laser power is 40 W, the laser spot diameter is 90-100 μm, the scanning speed is 0.1 m/s, the scanning spacing is 65 μm, the layer thickness is 30 μm, and the number of the processing layer is 1; linear energy density $M_1$=400 J/m;

Step 2:

first phase: unidirectionally scanning using continuous-wave laser, wherein the laser power is 300 W, the laser spot diameter is 60-70 μm, the scanning speed is 1.5 m/s, the scanning spacing is 60 μm, the layer thickness is 30 μm, and the number of the processing layers is 2-4; linear energy density $M_{21}$=200 J/m;

Second Phase:

first, unidirectionally scanning using pulse laser with the duty ratio of 30%, and gradually increasing the average laser power between 80-90 W, wherein the laser spot diameter is 60-70 μm, the scanning speed is 0.3 m/s, the scanning spacing is 60 μm, the layer thickness is 30 μm, and the number of the processing layers is 5; and then, keeping other parameters unchanged, and gradually increasing the average laser power between 90-100 W, wherein the scanning spacing is 50 μm, and the number of processing layers is 10;

Step 3:

unidirectionally scanning using pulse laser with the duty ratio of 30%, wherein the average laser power is 100 W, the laser spot diameter is 60-70n, the scanning speed is 0.3 m/s, the scanning spacing is 50 μm, and the layer thickness is 30 μm; linear energy density $M_3$=333 J/m.

Compared with the prior art, the present invention has the advantageous effects that:

by means of the processing method given by the present invention, a stable horizontal overhanging structure can be directly formed on the premise of not setting a vertical support, which can solve the following two problems, and expand the practical application of the SLM technology.

1. The problem that the SLM technology cannot process the closed cavity structure can be effectively solved, and the capability for the SLM to process a complicated cavity structure can be enhanced.

2. For the processing of an external horizontal overhanging structure, only a small number of vertical supports need to be set in the edge zone to resist residual stress, which greatly simplifies the processing and post-processing of workpiece, and reduces manufacturing costs of workpiece.

Numerals in the figures: 1. vertical texture; 2. stainless-steel substrate; 3. first initial horizontal overhanging layer, 4. second initial horizontal overhanging layer, 5. closed cavity structure workpiece; 6. cavity.

DETAILED DESCRIPTION

Figure 1:
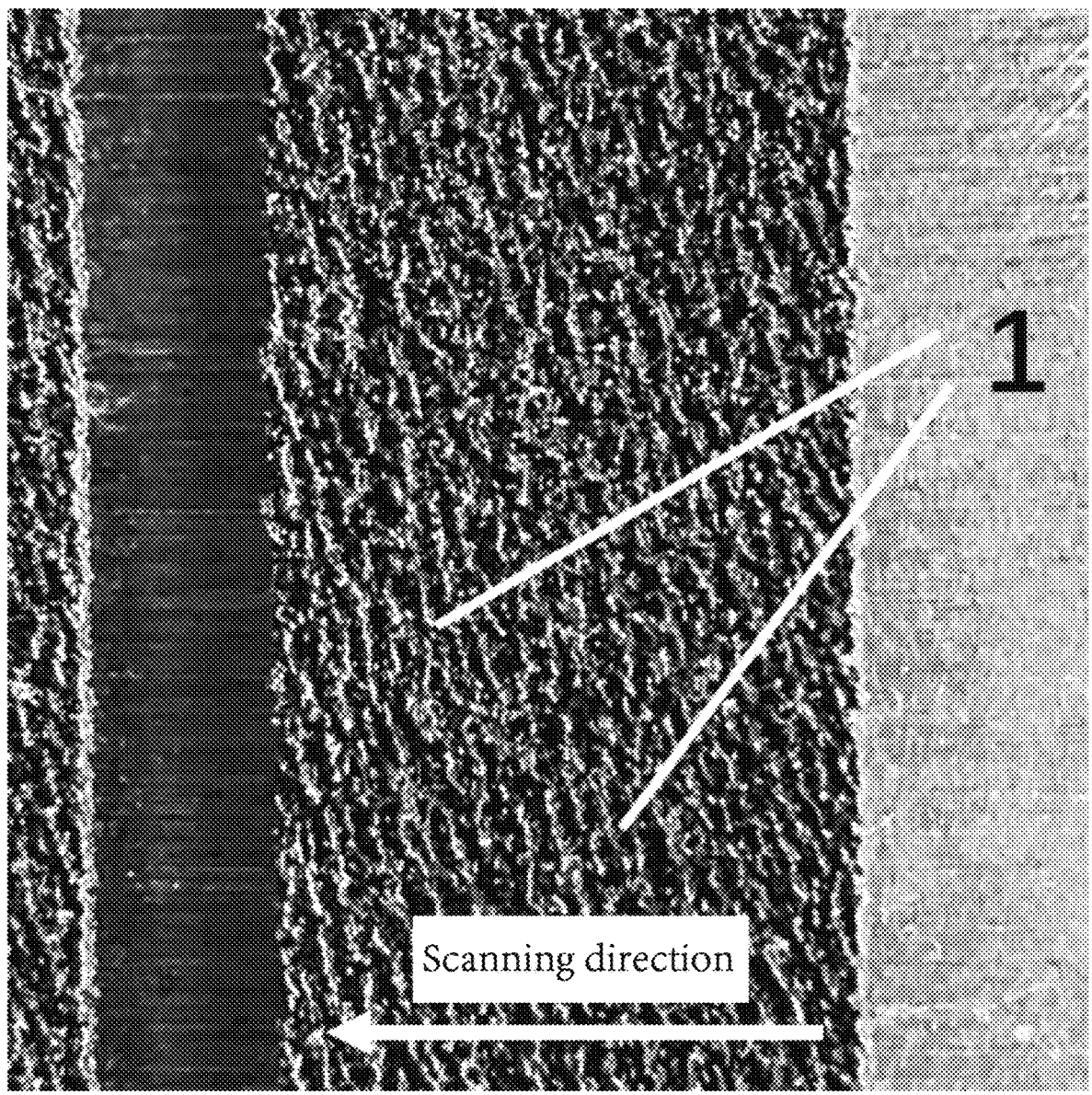
FIG. 1 shows a real top view image of an initial horizontal overhanging layer formed by the Plateau-Rayleigh instability effect.

In this embodiment, the method for forming a horizontal overhanging structure without vertical support in selective laser melting comprises: sequentially forming an initial layer, a repair layer and a conventional layer, wherein the initial layer is printed by scanning at a speed set lower than the conventional speed using a laser spot in a defocused state, so that the Plateau-Rayleigh instability effect occurs in each track, to form an initial layer with a specific texture structure; the specific texture structure refers to: forming texture different from the scanning direction using the Plateau-Rayleigh instability effect which occurs in the track; in FIG. 1, the scanning direction indicated by the arrow is a horizontal direction, and the texture direction is a vertical direction, that is, the vertical texture 1 shown in FIG. 1;

the repair layer is printed on the upper surface of the initial layer by scanning at a speed set higher than the conventional speed in a continuous-wave laser output mode using a laser spot in a focused state, and completes the transition from transition process parameters to conventional process parameters within the set number of processing layers; and the conventional layer is printed on the upper surface of the repair layer using the conventional process parameters, to form a horizontal overhanging structure without vertical support.

In specific implementation, the process parameters of the initial layer are set into:

$$A_1=(1.4\text{-}1.7)A_3;\ V_1=(10\%\text{-}40\%)V_3;\ L_1=(1.3\text{-}1.6)L_3;\ M_3<M_1;$$

where:

$A_1$ represents the diameter of the scanning laser spot of the initial layer, $A_3$ represents the diameter of the scanning laser spot of the conventional layer;

$V_1$ represents the scanning speed of the initial layer, $V_3$ represents the scanning speed of the conventional layer;

$L_1$ represents the scanning spacing of the initial layer, $L_3$ represents the scanning spacing of the conventional layer;

$M_1$ represents the linear energy density of the initial layer, $M_3$ represents the linear energy density of the conventional layer;

the number of the processing layer of the initial layer is 1; linear energy density=laser power/scanning speed;

for the printing of the initial layer, sufficient linear energy density is provided to ensure that the metal powder can be fully melted in the case of low scanning speed and large laser spot diameter, by using lower scanning speed and larger laser spot, the fluidity and flow time of a molten pool are increased, so that a Plateau-Rayleigh instability phenomenon occurs; by defocusing, the scanning laser spot is enlarged, and the sputtering during processing is reduced.

In specific implementation, the repair layer is printed on the upper surface of the initial layer using the transition process parameters according to the following two phases:

first phase: scanning at high speed in a continuous-wave laser output mode:

$$A_{21}=A_3;\ V_{21}=(3\text{-}6)V_3;\ L_3<L_{21}<L_1;\ M_{21}=(50\%\text{-}70\%)M_3;$$

where:

$A_{21}$ represents the diameter of the scanning laser spot in the first phase; $V_{21}$ represents the scanning speed in the first phase;

$L_{21}$ represents the scanning spacing in the first phase; $M_{21}$ represents the linear energy density in the first phase;

the number of the processing layers in the first phase is 2-4, wherein the scanning direction of the first layer is along a non-zero included angle from the scanning direction of the initial layer, and the scanning directions of the subsequent layers are rotated 90° layer by layer, in the first phase, the upper surface of the initial horizontal overhanging layer is quickly repaired, to reduce the surface roughness and increase the mechanical strength of the overhanging structure;

second phase: setting other process parameters into conventional process parameters for selective laser melting except for the linear energy density and scanning spacing;

wherein the linear energy density and scanning spacing are set as follows: from the line energy density $M_{21}$, the line energy density of each processing layer in the second phase is increased layer by layer, and from the scanning spacing $L_{21}$, the scanning spacing of each processing layer in the second phase is reduced layer by layer, so that the transition consistent with all process parameters of the conventional layer is completed within 10-20 processing layers; the second phase is used to transform parameters to the printing of the conventional layer, and further improve the mechanical strength of the overhanging structure, to prepare for going into the printing of the conventional layer.

In specific implementation, in the method for forming a horizontal overhanging structure without vertical support in selective laser melting, for stainless-steel powder, printing to form a horizontal overhanging structure without vertical support according to the following steps:

Step 1:

unidirectionally scanning using continuous-wave laser, wherein the laser power is 40 W, the laser spot diameter is 90-100 μm, the scanning speed is 0.1 m/s, the scanning spacing is 65 μm, the layer thickness is 30 μm, and the number of the processing layer is 1; linear energy density $M_1$=400 J/m;

Step 2:

first phase: unidirectionally scanning using continuous-wave laser, wherein the laser power is 300 W, the laser spot diameter is 60-70 μm, the scanning speed is 1.5 m/s, the scanning spacing is 60 μm, the layer thickness is 30 μm, and the number of the processing layers is 2-4; linear energy density $M_{21}$=200 J/m;

Second Phase:

first, unidirectionally scanning using pulse laser with the duty ratio of 30%, and gradually increasing the average laser power between 80-90 W, wherein the laser spot diameter is 60-70 μm, the scanning speed is 0.3 m/s, the scanning spacing is 60 μm, the layer thickness is 30 μm, and the number of the processing layers is 5; and then, keeping other parameters unchanged, and gradually increasing the average laser power between 90-100 W, wherein the scanning spacing is 501 μm, and the number of processing layers is 10;

Step 3:

unidirectionally scanning using pulse laser with the duty ratio of 30%, wherein the average laser power is 100 W, the laser spot diameter is 60-70 μm, the scanning speed is 0.3 m/s, the scanning spacing is 50 μm, and the layer thickness is 30 μm; linear energy density $M_3$=333 J/m.

Figure 2:
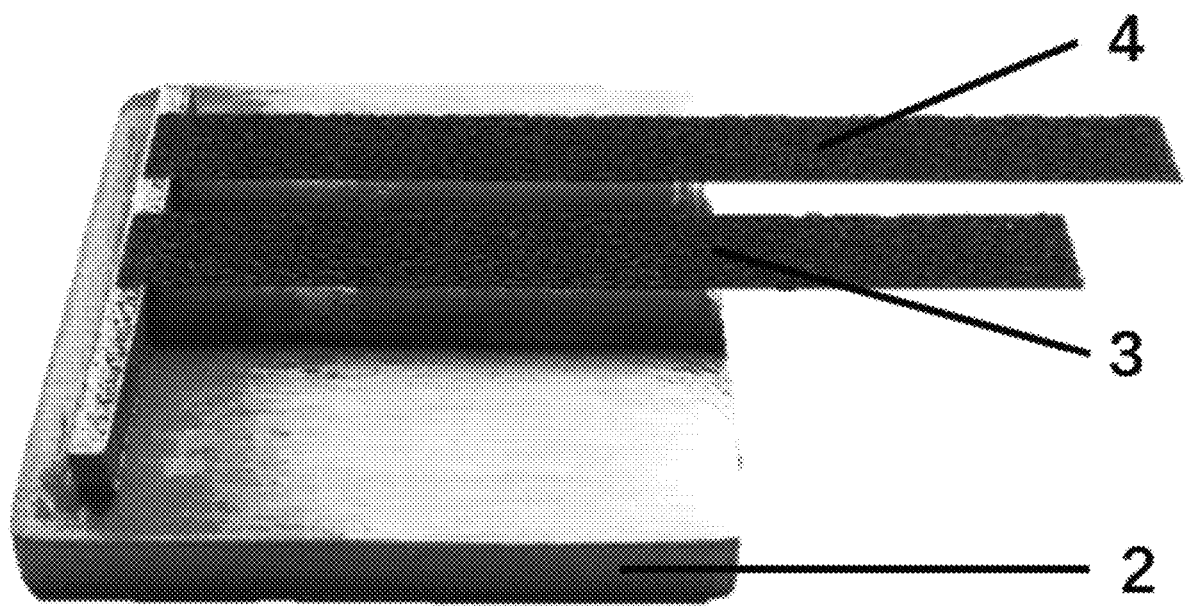
FIG. 2 shows a real image of an initial horizontal overhanging layer having large span printed in embodiment 1 of the present invention.

Embodiment 1: Printing Initial Horizontal
Overhanging Layer Having Large Span as shown in FIG. 2, first, printing a small cuboid with a dimension of 40 mm*2.5 mm*4 mm on a stainless-steel substrate 2 with a dimension of 50 mm*50 mm*6 mm using conventional process parameters; then, printing a first initial horizontal overhanging layer 3 with a dimension of 70 mm*8 mm and a second initial horizontal overhanging layer 4 with a dimension of 80 mm*8 mm on one side of the top of the small cuboid; FIG. 2 shows a real image of an initial horizontal overhanging layer having large span printed; the process parameters are set as follows: in the continuous-wave laser output mode, the laser power is 40 W, the laser spot diameter is 90-100 μm, the scanning speed is 0.1 m/s, the scanning spacing is 65 μm, the layer thickness is 30 μm, and the number of the processing layer is 1. This embodiment indicates that by means of the method of the present invention, an initial horizontal overhanging layer having large span and having certain mechanical strength can be stably processed.

Figure 3:
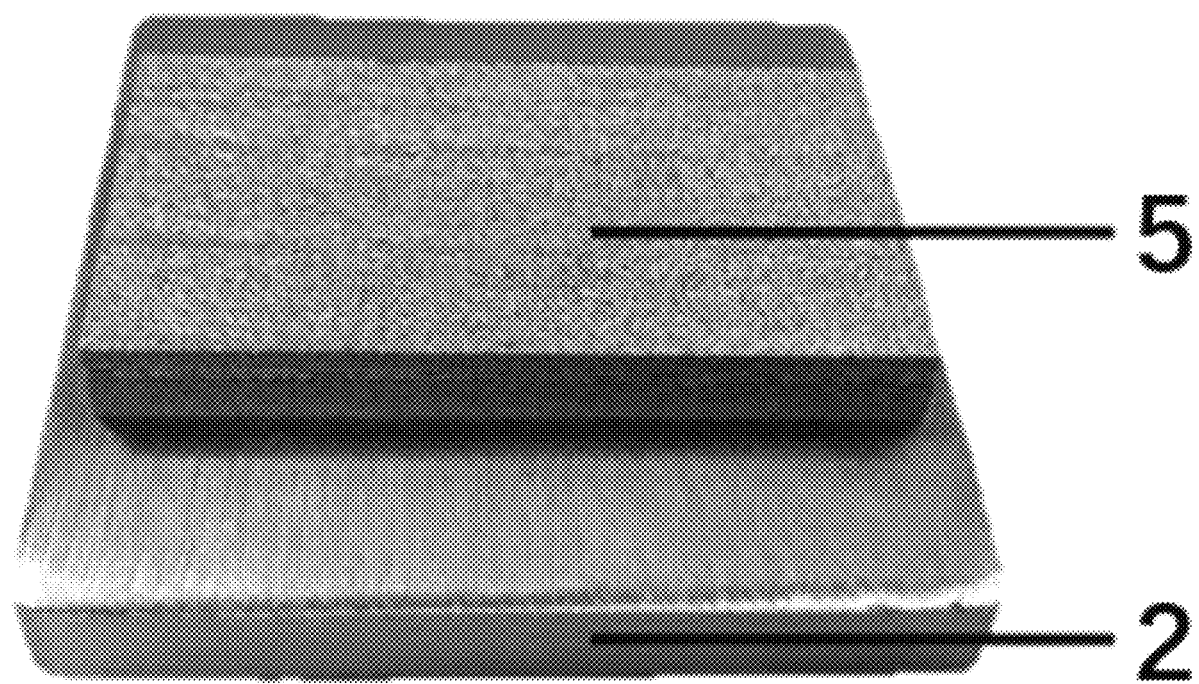
FIG. 3 shows a real image of stainless-steel closed cavity structure workpiece printed in embodiment 2 of the present invention.

Embodiment 2: Printing a Closed Cavity Structure
with an Internal Size of 40 mm*20 mm According
to the Following Steps Step a. as shown in FIG. 3, printing a base in a frame shape on the stainless-steel substrate 2 with a dimension of 50 mm*50 mm*6 mm using conventional process parameters, wherein the number of processing layers is 100; the external dimension of the print area is 45 mm*25 mm, the internal dimension is 40 mm*20 mm, and the wall thickness is 2.5 mm.

Step b. processing the overhanging closed initial layer, wherein the process parameters are set as follows: in the continuous-wave laser output mode, the laser power is 40 W, the laser spot diameter is 90-100 μm, the scanning speed is 0.1 m/s, the scanning spacing is 65 μm, the layer thickness is 30 μm, and the number of the processing layer is 1.

Step c. continuing to process the two-layer structure in the frame shape using the process parameters of step a.

Step d. repairing the upper surface of the overhanging layer in three steps:

Step 1: setting process parameters: in the continuous-wave laser output mode, the laser power is 300 W, the laser spot diameter is 60-70 μm, the scanning speed is 1.5 m/s, the scanning spacing is 60 μm, the layer thickness is 30 μm, wherein the scanning direction is along an included angle of 45° from the scanning direction of the initial horizontal overhanging layer, the number of the processing layers is 2, and the scanning direction of the second layer is rotated 90°;

Step 2: setting process parameters: using pulse laser with the duty ratio of 30%, and gradually increasing the average laser power between 80-90 W, wherein the laser spot diameter is 60-70 μm, the scanning speed is 0.3 m/s, the scanning spacing is 60 μm, the layer thickness is 30 μm, and the number of the processing layers is 5; and Step 3: setting process parameters: using pulse laser with the duty ratio of 30%, and gradually increasing the average laser power between 90-100 W, wherein the laser spot diameter is 60-70 μm, the scanning speed is 0.3 m/s, the scanning spacing is 50 μm, the layer thickness is 30 μm, and the number of the processing layers is 10.

Step e. going to conventional printing, the number of processing layers being 50, and completing the processing of closed cavity structure workpiece 5 shown in FIG. 3, wherein the workpiece has a cuboid with the dimension of 45 mm*25 mm*5 mm outside, and a closed cavity structure with the dimension of 40 mm*20 mm*3 mm inside, and has no any vertical support, so that the micron-level metal powder in the cavity can be poured out by providing a millimeter-level hole.

Figure 4:
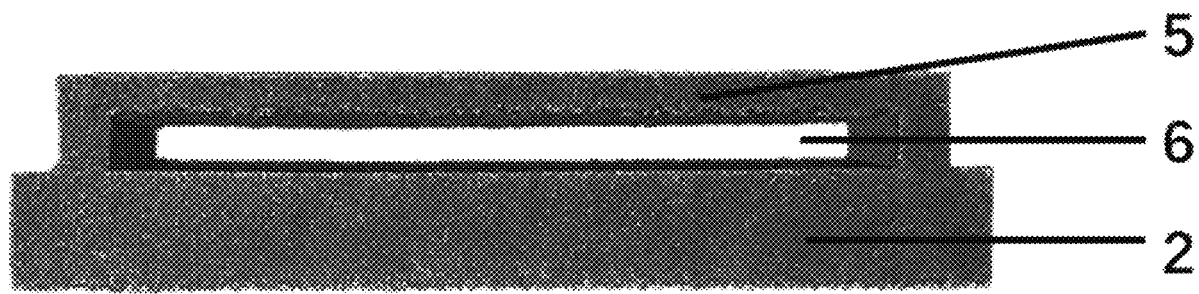
FIG. 4 shows a side view image of a middle section of workpiece after cutting in embodiment 2 of the present invention.

In order to observe the interior of the workpiece, the workpiece is cut from both sides by wire cutting. The cavity 6 formed inside the closed cavity structure workpiece 5 is illustrated in FIG. 4.

The invention claimed is:

1. A method for forming a horizontal overhanging structure in selective laser melting, comprising: sequentially forming an initial layer, a repair layer and a conventional layer, wherein printing an initial layer by scanning at a speed of $V_1$ by a laser spot in a defocused state, so that Plateau-Rayleigh instability effect occurs to form the initial layer with a texture structure; wherein a texture direction of the texture structure is different from a scanning direction of the initial layer;

printing a repair layer on an upper surface of the initial layer by scanning at a speed of $V_{21}$ in a continuous-wave laser output mode using a laser spot in a focused state; and printing a conventional layer on an upper surface of the repair layer; wherein the initial layer, the repair layer and the conventional layer form the horizontal overhanging structure;

the repair layer is printed on the upper surface of the initial layer using transition process parameters according to following two phases:

first phase: unidirectionally scanning using continuous-wave laser: wherein $$A_{21}=A_3;\ V_{21}=(3\text{-}6)V_3;\ L_3<L_{21}<L_1;\ M_{21}=(50\%\text{-}70\%)M_3;$$

wherein:

$A_{21}$ represents a diameter of a scanning laser spot in the first phase; $V_{21}$ represents a scanning speed in the first phase; $L_{21}$ represents a scanning spacing in the first phase; $M_{21}$ represents a linear energy density in the first phase;

a number of the repair layers in the first phase is 2-4, wherein a scanning direction of a first layer of the 2-4 repair layers and the scanning direction of the initial layer form an angle, and scanning directions of subsequent layers of the 2-4 repair layers are rotated 90° layer by layer;

second phase: increasing a line energy density layer by layer; and reducing a scanning spacing layer by layer.

2. The method for forming a horizontal overhanging structure in selective laser melting according to claim 1, wherein process parameters of the initial layer are set into:

$$A_1=(1.4\text{-}1.7)A_3;\ V_1=(10\%\text{-}40\%)V_3;\ L_1=(1.3\text{-}1.6)L_3;\ M_3<M_1;$$

where:

$A_1$ represents a diameter of a scanning laser spot of the initial layer; $A_3$ represents a diameter of a scanning laser spot of the conventional layer; $V_1$ represents a scanning speed of the initial layer; $V_3$ represents a scanning speed of the conventional layer; $L_1$ represents a scanning spacing of the initial layer; $L_3$ represents a scanning spacing of the conventional layer; $M_1$ represents a linear energy density of the initial layer; $M_3$ represents a linear energy density of the conventional layer; a number of linear energy density=laser power/scanning speed.

3. The method for forming a horizontal overhanging structure in selective laser melting according to claim 2, wherein in the step of printing the initial layer,
continuous-wave laser is used for unidirectionally scanning, wherein a laser power is 40 W, a laser spot diameter is 90-100 μm, the scanning speed of the initial layer is 0.1 m/s, the scanning spacing of the initial layer is 65 μm, a layer thickness is 30 μm; the linear energy density of the initial layer $M_1$=400 J/m;

in the step of printing the repair layer,
in the first phase, wherein a laser power is 300 W, a laser spot diameter is 60-70 μm, the scanning speed in the first phase is 1.5 m/s, the scanning spacing in the first phase is 60 μm, a layer thickness is 30 μm; the linear energy density in the first phase $M_{21}$=200 J/m;

in the second phase:
first, pulse laser with a duty ratio of 30% is used for unidirectionally scanning, and an average laser power is gradually increased between 80-90 W, wherein a laser spot diameter is 60-70 μm, a scanning speed is 0.3 m/s, a layer thickness is 30 μm, and a number of repair layers processed is 5; and then, the average laser power is gradually increased between 90-100 W, wherein a scanning spacing is 50 μm, and a number of repair layers processed is 10;

in the step of printing the conventional layer,
pulse laser with a duty ratio of 30% is used for unidirectionally scanning, wherein an average laser power is 100 W, a laser spot diameter is 60-70 μm, the scanning speed of the conventional layer is 0.3 m/s, the scanning spacing of the conventional layer is 50 μm, and a layer thickness is 30 μm; the linear energy density of the conventional layer $M_3$=333 J/m.

* * * * *